United States Patent [19]

Eberhardt

[11] Patent Number: 5,044,217
[45] Date of Patent: Sep. 3, 1991

[54] BEVEL GEAR DRIVE

[75] Inventor: Helmut Eberhardt, Gründau, Fed. Rep. of Germany

[73] Assignee: Leybold Aktiengesellschaft, Hanau am Main, Fed. Rep. of Germany

[21] Appl. No.: 170,713

[22] Filed: Mar. 21, 1988

[30] Foreign Application Priority Data

Jan. 20, 1988 [DE] Fed. Rep. of Germany ....... 3801434

[51] Int. Cl.$^5$ .......................... F16H 1/14; F16H 37/06
[52] U.S. Cl. ...................................... 74/417; 74/423; 74/665 GB
[58] Field of Search .......... 74/417, 423, 424, 665 GB, 74/385, 386, 387

[56] References Cited

U.S. PATENT DOCUMENTS

| | | | |
|---|---|---|---|
| 2,997,894 | 8/1961 | Klein | 74/423 |
| 4,192,253 | 3/1980 | Aichert et al. | 118/712 |
| 4,856,373 | 8/1989 | Washizawa | 74/665 GB X |
| 4,860,526 | 8/1989 | Hottes | 74/417 X |

FOREIGN PATENT DOCUMENTS 2813180 12/1985 Fed. Rep. of Germany .
128221 3/1950 Sweden .................. 74/417

Primary Examiner—Allan D. Herrmann
Assistant Examiner—David W. Laub
Attorney, Agent, or Firm—Felfe & Lynch

[57] ABSTRACT

A bevel angle drive having an input shaft with a plurality of first gears disposed at intervals thereon and a plurality of output shafts driven through second gears by the first gears and disposed radially to the input shaft. Each of the first gears has a hollow shaft. The output shafts with the second gears in the form of bevel gears are mounted each in a drive casing in which the particular first gear is journaled. The input shaft is brought in a longitudinally displaceable manner through each hollow shaft of all first gears and is joined for co-rotation to the letter by means of a driver.

6 Claims, 3 Drawing Sheets

BEVEL GEAR DRIVE

The invention relates to a multiple angle drive with an input shaft having a plurality of first gears disposed at intervals thereon and a plurality of output shafts running radially from the input shaft and driven by the first gears through second gears.

BACKGROUND OF THE INVENTION

A multiple angle drive of this kind is disclosed in DE-PS 28 13 180 and the corresponding U.S. Pat. No. 4,192,253; it serves to impart a rotation in the same sense at periodically varying angular velocities to substrates in the form of turbine blades connected to the output shafts in the depositing of anticorrosive coatings from a vapor in a vacuum at high temperatures. The individual drives consist of pinions disposed on the input shaft and crown gears disposed on the output shafts in order that the input shaft may be able in its thermal expansion to perform a longitudinal movement with respect to the radial output shafts. The crown gears must, however, either be made with very thin walls or tapered in order to be at all able to run on the pinions. At the stated high temperatures, and the absence of lubrication in that case, this results in off-center running, a lateral deflection of the input shaft so that teeth are jumped, and the angle between the output shafts and the input shaft changes. This is not acceptable in the vapor depositing of turbine blades, because due to the complex geometrical shape of the blades the variable angular velocity described above is necessary during the coating process.

The invention therefore is addressed to the problem of devising an angle drive of the kind described above in which a reliable meshing of the teeth will be assured and wear will be largely prevented despite the severe operating conditions.

SUMMARY OF THE INVENTION

The solution of the problem described is accomplished according to the invention, in the angle drive described above, in that each output shaft is journaled together with the second gear, which is in the form of a bevel gear, in a drive casing in which the first gear in the form of a bevel gear meshing with the second gear is also journaled, and that the input shaft is brought in a longitudinally displaceable manner through all first gears and is joined for co-rotation with them by means of a driver.

By following the teaching of the invention, each drive casing constitutes at the same time one of many bearings for the input shaft, which consequently cannot be deflected laterally or run out of round. The tight clearance necessary between the pairs of gears can be adjusted individually and invariably. Any change in the length of the input shaft will have no harmful effect on the gear pairs, since the shaft can expand unhampered through the gears disposed on it. Above all, however, bevel gears with an appropriately great meshing depth and low flank pressure can be used, so that even under the existing poor lubrication wear will be slight and the jumping of teeth will be impossible.

It is especially advantageous if the drive casings are inserted into lateral receptacles of a central casing surrounding the input shaft. This greatly facilitates manufacture and assembly: drive casing, central casing and receptacles can be made from pipe sections.

It is furthermore advantageous if the lateral receptacles of the central casing have a cylindrical inside surface and the drive casings have each a cylindrical outside surface of corresponding diameter.

It is advantageous too if the drive casing first has a hollow cylindrical piece which can be inserted with its outer surface into the receptacles in the central casing, and has on its inside surface a bearing ring for the output shaft, and secondly a bearing cap which bears a bearing ring for the first gear. The advantages of such construction will be further explained in the detailed description.

Especially great ease of assembly and maintenance will result especially if the bearing ring for the input shaft is inserted into the receptacle together with the latter and the second gear in the direction of the bearing cap and the first gear. In this case the parts can simply be plugged one into the other and need only to be secured by set screws.

BRIEF DESCRIPTION OF THE DRAWINGS

An embodiment of the subject matter of the invention will be further explained below in conjunction with FIGS. 1 and 3.

DESCRIPTION OF THE PREFERRED EMBODIMENTS

Figure 1:
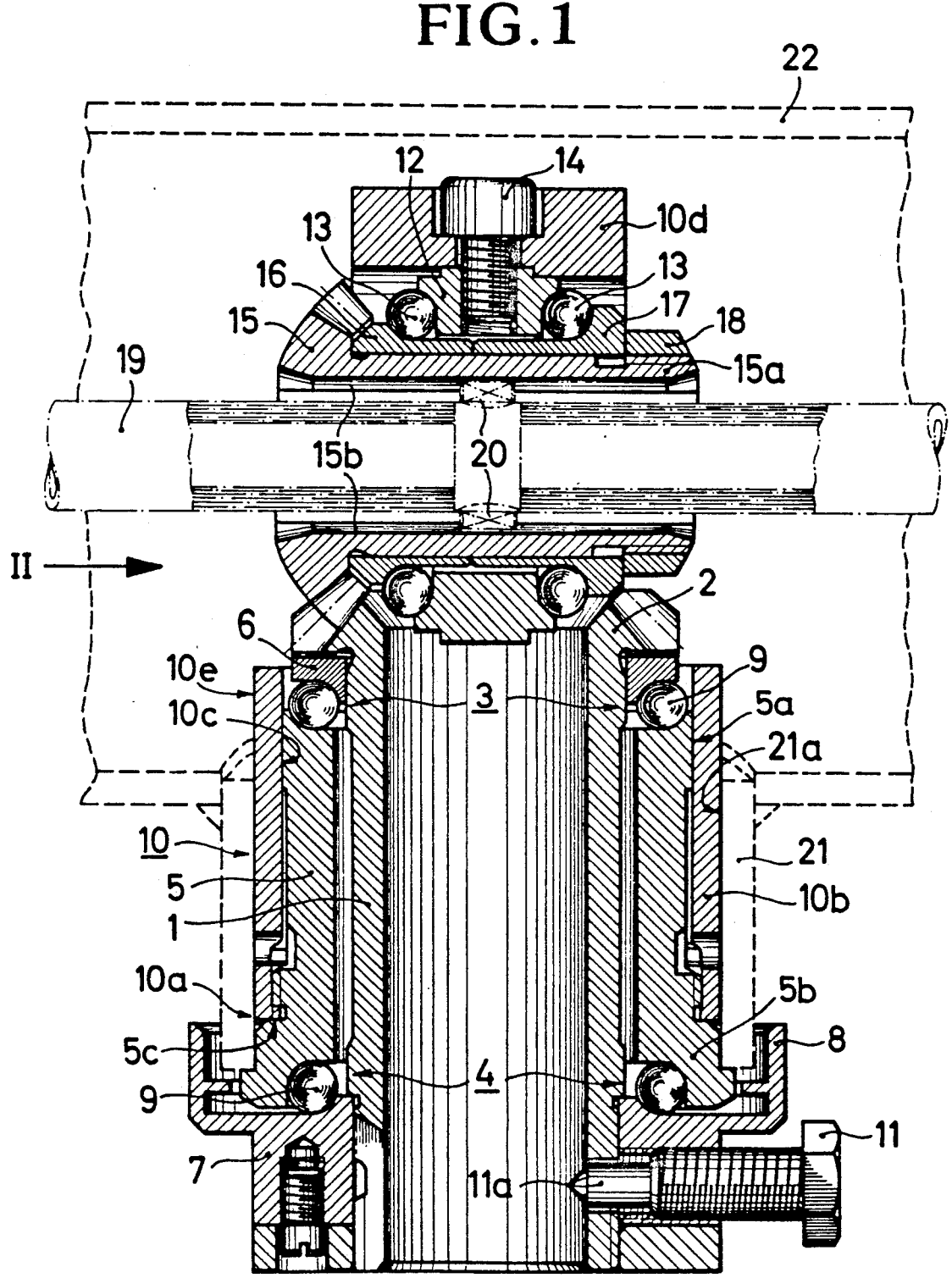
FIG. 1 is a longitudinal section through a drive casing along the axes of the input and output shafts mounted therein.

In FIG. 1 there is represented a hollow output shaft 1 which is integral with a second gear 2, a bevel gear, and is mounted in two rolling bearings 3 and 4 in an outer bearing ring 5 having a cylindrical outside surface 5a. Two inner counter bearing rings 6 and 7 are affixed the output shaft 1 for co-rotation therewith. The counter bearing ring 7 has a protective collar 8 which overlaps the bearing ring 5 to protect (against vapor deposits) the bearing ball 9 which consists of ceramic, the bearing ring having at this point a circumferential flange 5b with a shoulder 5c. The bearing ring 5 is inserted axially into the drive casing until it abuts against its shoulder 5c. In the bearing ring 7 a radial set screw 11 is also mounted, which has a spike-like prolongation 11a which reaches into the cylindrical hollow of the output shaft 1 and serves for the clamping of a cylindrical projection on the substrate, which is not shown.

The drive casing 10 has a hollow cylinder 10b which bears on its cylindrical inside surface 10c the bearing ring 5 as well as a bearing cap 10d which extends axially out from the hollow cylinder and into which an additional outer bearing ring 12 with two rows of bearing balls 13 is inserted from the side and is held by two radial screws 14 (the section plane in this regard is drawn offset in FIG. 1). Into the bearing ring 12 an additional gear 15 in the form of a bevel gear is inserted, which meshes with gear 2 and is prolonged by a hollow shaft 15a on which (for reasons of assembly) two inner bearing rings 16 and 17, clamped against one another, are held against rotation by a nut 18.

An input shaft 19 is brought in a longitudinally displaceable manner through the hollow shaft 15a and has in the center of each hollow shaft 15a two diametrically opposite sliding blocks 20 which engage two corresponding longitudinal grooves 15b in the hollow shaft 15a and form a driver for the gear 15.

Figure 3:
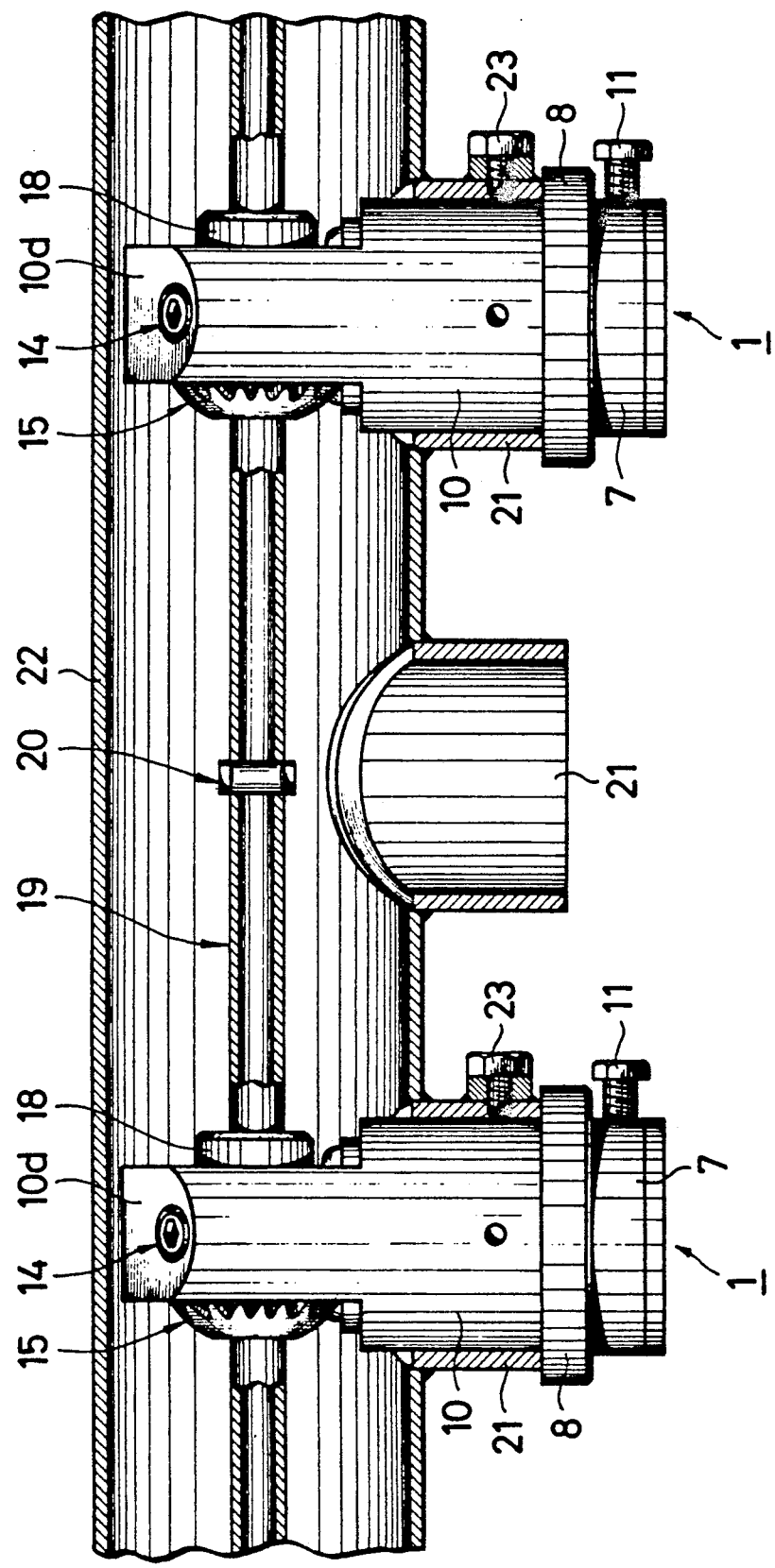
FIG. 3 is an axial section through the central casing and its lateral receptacles showing the drive cases inserted therein (viewed in the direction of the arrow III in FIG. 2.

The drive casing 10 is inserted with its cylindrical outer surface 10e into the cylindrical inner surface 21a of one of the receptacles 21 of the central casing 22 and is held therein by a set screw 23 (shown in FIG. 3).

Figure 2:
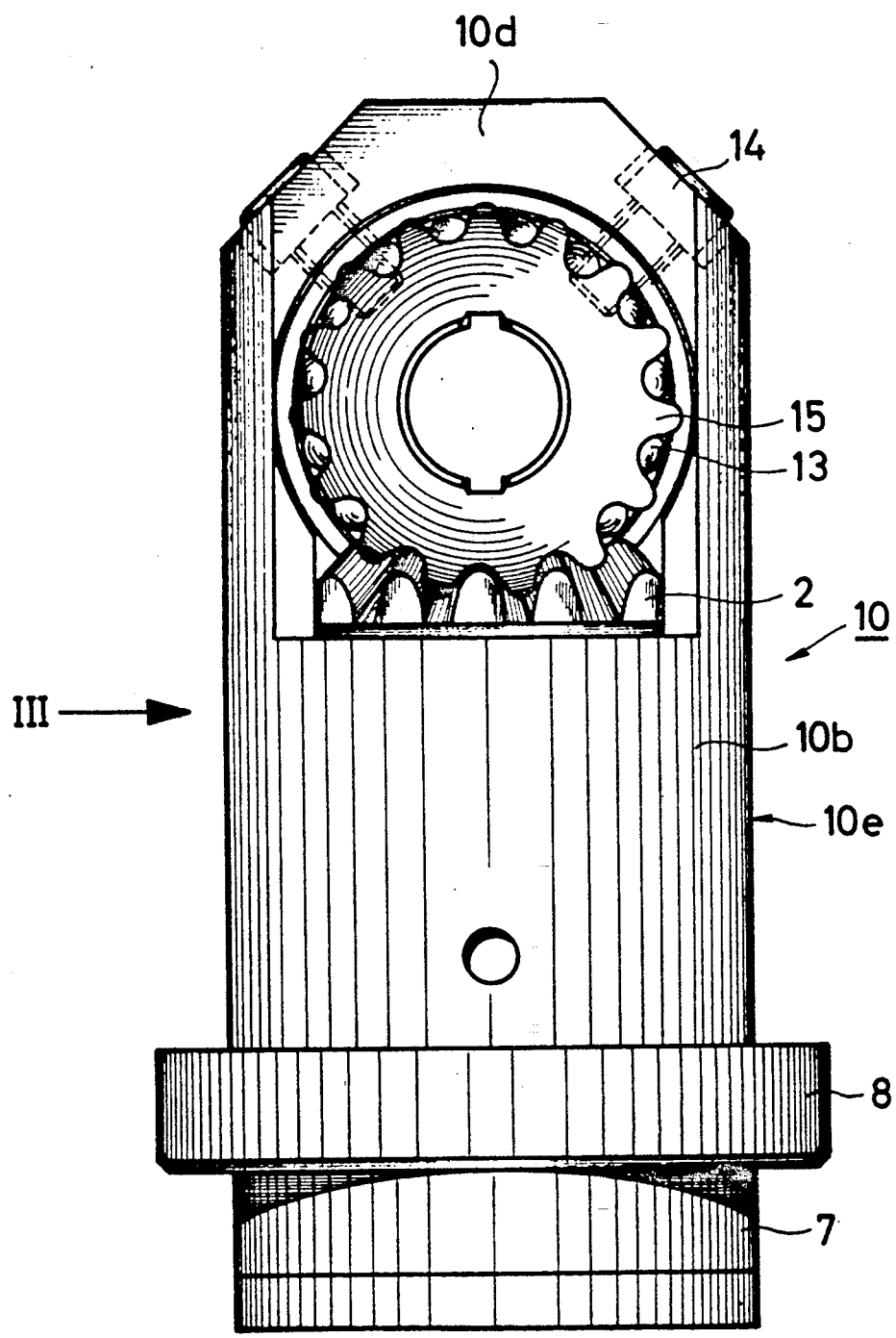
FIG. 2 is a side view of the drive casing as viewed parallel to the axis of the input shaft (arrow II FIG. 1)

FIG. 3 shows a section of a multiple angle drive with an input shaft 19 and three hollow cylindrical receptacles 21 which are inserted in the radial direction into the likewise hollow cylindrical central casing 22 and are welded to the latter. FIG. 2 is a side view of the drive casing as viewed parallel to the axis of the input shaft (arrows II in FIG. 1). In two of these receptacles of FIG. 3 drive casings 10 equipped in accordance with FIG. 1 and 2 are inserted, while the middle receptacle has been left free for clarification purposes. FIG. 3 shows impressively that the individual angle drives according to the invention can be used modularly for the construction of a great variety of multiple angle drives.

I claim:

1. Multiple angle drive comprising: an input shaft with a plurality of first gears disposed at intervals thereon, and a plurality of output shafts driven through second gears by the first gears and disposed radially to the input shaft, each of said first gears having a hollow shaft, a drive casing and a driven, the output shafts with the second gears in the form of bevel gears being mounted each in the drive casing in which the particular first gear is journaled, and the input shaft being brought in a longitudinally displaceable manner through each hollow shaft of all first gears and being joined for co-rotation to the latter by means of the driver.

2. Angle drive according to claim 1, which includes a central casing surrounding the input shaft and having lateral receptacles in which drive casings are inserted into the lateral receptacles on the central casing surrounding the input shaft.

3. Angle drive according to claim 2, in which the lateral receptacles of the central casing have a cylindrical inner surface and each drive casing has a cylindrical outside surface of corresponding diameter.

4. Angle drive according to claim 2, in which a drive casing
   a) has a hollow cylindrical piece which can be inserted with its outside surface into the receptacle of the central casing and bears on its inner surface a bearing ring for the output shaft, and
   b) a bearing cap extending from the hollow cylindrical piece, which envelops a bearing ring for the first gear, 5. Angle drive according to claim 4, in which the bearing ring for the output shaft is inserted with the latter and the second gear toward the bearing cap and the first gear is inserted into the receptacle.

6. Angle drive according to claim 4, in which the bearing ring has rolling bearings and in which the output shaft with the second gear is mounted on the rolling bearings in the bearing ring, and which includes at least rolling bodies of ceramic or ceramic metal material.

* * * * *

UNITED STATES PATENT AND TRADEMARK OFFICE
CERTIFICATE OF CORRECTION

PATENT NO. : 5,044,217

DATED : September 3, 1991

INVENTOR(S) : Helmut Eberhardt

It is certified that error appears in the above-identified patent and that said Letters Patent is hereby corrected as shown below:

Column 2, line 29 for "driven" read -- driver --.

Signed and Sealed this

Ninth Day of March, 1993

*Attest:*

STEPHEN G. KUNIN

*Attesting Officer*     *Acting Commissioner of Patents and Trademarks*